(12) United States Patent
Cherniak et al.

(10) Patent No.: US 9,388,761 B2
(45) Date of Patent: Jul. 12, 2016

(54) COMBINED FUELING STRATEGY FOR GASEOUS FUEL

(71) Applicant: Robert Bosch GmbH, Stuttgart (DE)

(72) Inventors: Ryan Joseph Cherniak, Royal Oak, MI (US); Sree Kumara Menon, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 14/061,959

(22) Filed: Oct. 24, 2013

(65) Prior Publication Data

US 2014/0114552 A1 Apr. 24, 2014

Related U.S. Application Data

(60) Provisional application No. 61/717,835, filed on Oct. 24, 2012.

(51) Int. Cl.
*F02M 21/02* (2006.01)
*F02D 41/00* (2006.01)
*F02D 41/30* (2006.01)
(Continued)

(52) U.S. Cl.
CPC .......... *F02D 41/3094* (2013.01); *F02D 19/023* (2013.01); *F02D 41/0027* (2013.01); *F02M 21/0215* (2013.01); *F02M 21/0275* (2013.01); *F02M 21/0284* (2013.01); *F02M 21/04* (2013.01); *F02D 2250/18* (2013.01); *F02D 2250/21* (2013.01); *F02D 2250/22* (2013.01); *Y02T 10/32* (2013.01)

(58) Field of Classification Search
CPC ............ F02D 41/0027; F02D 41/3094; F02D 41/045; F02D 41/10; F02D 41/36; F02D 19/025; F02D 19/024; F02D 19/0642; F02D 19/0647; F02D 19/066; F02D 19/08; F02D 19/081; F02M 21/0287; F02M 21/0284; F02M 21/0215; F02M 21/0218; F02M 21/0275; F02M 21/0278; F02M 21/0212
USPC ......................................... 123/472
See application file for complete search history.

(56) References Cited

U.S. PATENT DOCUMENTS

| | | | |
|---|---|---|---|
| 5,052,360 A | 10/1991 | Ingle et al. | |
| 5,477,830 A * | 12/1995 | Beck ................ | F02M 35/10216 123/470 |
| 5,671,711 A * | 9/1997 | Collie ..................... | F02B 43/00 123/299 |

(Continued)

FOREIGN PATENT DOCUMENTS

| | | |
|---|---|---|
| EP | 1561936 | 8/2005 |
| WO | 2006079173 | 8/2006 |

OTHER PUBLICATIONS

International Search Report and Written Opinion for Application No. PCT/US2013/066505 dated Feb. 18, 2014 (11 pages).

*Primary Examiner* — Lindsay Low
*Assistant Examiner* — George Jin
(74) *Attorney, Agent, or Firm* — Michael Best & Friedrich LLP

(57) ABSTRACT

A method of operating an internal combustion engine with gaseous fuel includes providing fuel to a plurality of cylinders with both central point injection and multipoint injection. Central point injection, which provides good air/fuel mixing, may provide a majority of steady-state fueling, and multipoint injection is used for supplementing the central point injection during steady-state and for providing rapid transient response to load changes.

18 Claims, 2 Drawing Sheets

(51) Int. Cl.
*F02M 21/04* (2006.01)
*F02D 19/02* (2006.01)

(56) References Cited

U.S. PATENT DOCUMENTS

| | | | |
|---|---|---|---|
| 5,775,282 A * | 7/1998 | Smith | F02D 19/0647 |
| | | | 123/179.8 |
| 6,371,092 B1 * | 4/2002 | Guglielmo | F02D 35/0092 |
| | | | 123/435 |
| 6,508,233 B1 * | 1/2003 | Suhre | F02B 61/045 |
| | | | 123/299 |
| 6,918,383 B2 | 7/2005 | Hunt et al. | |
| 7,017,556 B2 | 3/2006 | Borg | |
| 7,051,713 B2 | 5/2006 | Mashiki | |
| 7,252,069 B2 | 8/2007 | Date et al. | |
| 7,894,973 B2 | 2/2011 | Mallebrein | |
| 7,992,539 B2 | 8/2011 | Ikoma | |
| 8,100,107 B2 | 1/2012 | Bidner et al. | |
| 2001/0003977 A1 | 6/2001 | Hayashi et al. | |
| 2002/0078918 A1 | 6/2002 | Ancimer et al. | |
| 2006/0169255 A1 * | 8/2006 | Bertsch | F02D 23/00 |
| | | | 123/527 |
| 2006/0207550 A1 * | 9/2006 | Saito | F02B 17/005 |
| | | | 123/305 |
| 2012/0041665 A1 * | 2/2012 | Pursifull | F01B 1/02 |
| | | | 701/103 |
| 2014/0244137 A1 * | 8/2014 | Nakano | F02D 41/3094 |
| | | | 701/104 |
| 2015/0354492 A1 * | 12/2015 | Surnilla | F02D 41/3094 |
| | | | 123/349 |

* cited by examiner

COMBINED FUELING STRATEGY FOR GASEOUS FUEL

CROSS-REFERENCE TO RELATED APPLICATIONS

This application claims priority to U.S. Provisional Patent Application No. 61/717,835, filed Oct. 24, 2012, the entire contents of which are incorporated by reference herein.

BACKGROUND

The present invention relates to internal combustion engines, and more particularly, to strategies for injecting gaseous fuel, such as natural gas or propane, in internal combustion engines. Although some vehicles are currently operated on natural gas (CNG/LNG) or propane (LPG), they have not yet achieved mainstream market acceptance.

SUMMARY

In one aspect, the invention provides a method of operating an internal combustion engine with gaseous fuel. A plurality of cylinders are provided having respective pistons and combustion chambers. An intake system including a throttle body, and an intake manifold, is provided. A fuel system configured to supply a quantity of fuel and inject the fuel in a gaseous state is also provided. The fuel supply system includes a central fuel injector positioned upstream of the intake manifold and configured to provide fuel to all of the plurality of cylinders, and a plurality of cylinder-dedicated fuel injectors separate from the central fuel injector, each of the plurality of cylinder-dedicated fuel injectors positioned downstream of the central fuel injector and configured to provide fuel to only one associated cylinder of the plurality of cylinders. The internal combustion engine is operated at a steady-state partial load with a first portion of gaseous fuel supplied by the central fuel injector and a second portion of gaseous fuel supplied by the plurality of cylinder-dedicated fuel injectors. A demand for a change in total fuel amount for the engine to a target total fuel amount is identified, the demand defining a transition point. A target fraction of the total fuel amount is identified for each of the central fuel injector and the plurality of cylinder-dedicated fuel injectors for steady-state operation at the target total fuel amount. The change is responded to by gradually changing the fuel amount from the central fuel injector to the corresponding target fraction within a first time span from the transition point and, within a second time span from the transition point, shorter than the first time span, exceeding the corresponding target fraction for the plurality of cylinder-dependent fuel injectors to compensate for the slower response of the central fuel injector and meet the target total fuel amount prior to expiration of the first time span.

In another aspect, the invention provides a method of operating an internal combustion engine with gaseous fuel. The internal combustion engine is operated at a first steady-state torque output with a total gaseous fuel amount including a first portion of gaseous fuel supplied by a central fuel injector for combustion by all of a plurality of cylinders of the internal combustion engine and a second portion of gaseous fuel supplied to individual ones of the plurality of cylinders via a plurality of cylinder-dedicated fuel injectors. A target torque output demanded from the internal combustion engine within an available torque output range is detected, the target torque output requiring a change in the total gaseous fuel amount corresponding to the first steady-state torque output. The change has a direction which is one of increasing or decreasing. A total gaseous fuel amount corresponding to the target torque output and a corresponding steady-state ratio between gaseous fuel supplied by the central fuel injector and gaseous fuel supplied by the plurality of cylinder-dedicated fuel injectors are identified for the target torque output. The steady-state ratio is achieved by providing a two-part response by the plurality of cylinder-dedicated fuel injectors and a single response by the central fuel injector. The target torque output is initially achieved upon completion of a primary response in the direction of change by the plurality of cylinder-dedicated fuel injectors, and the target torque output is maintained during a secondary response by the plurality of cylinder-dedicated fuel injectors in the direction opposite the change.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
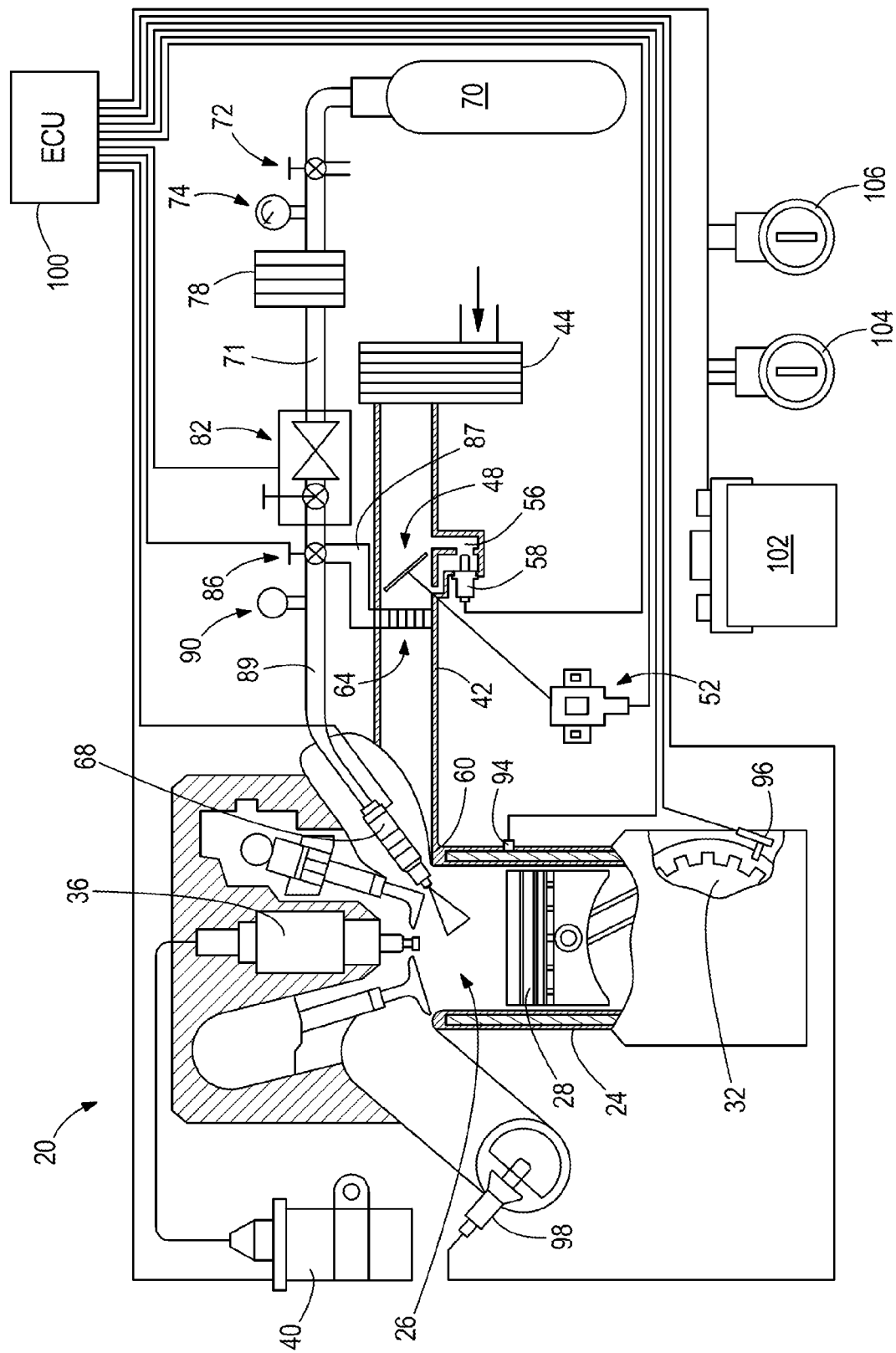
FIG. 1 is a schematic view of an internal combustion engine according to one aspect of the present invention.

FIG. 1 is a schematic view of an internal combustion engine 20 with at least one cylinder 24. An intake system and a fuel system supply air and gaseous fuel, respectively, to the cylinder 24 for combustion. As discussed in further detail below, the fuel system provides coupled central point and multipoint injection for spark-ignition within the combustion chambers 26 of the engine 20. Although only one cylinder 24 is shown, the engine 20 can be a multi-cylinder engine. The engine 20 can operate on gaseous fuel such as natural gas or propane. The engine 20 can be provided in a vehicle (e.g., commercial vehicle) to provide motive driving force to the vehicle.

Each cylinder 24 of the engine 20 receives a piston 28 which reciprocates therein, corresponding to the four strokes of a known four-stroke operation. All of the pistons 28 of the cylinders 24 are coupled to a crankshaft 32, which rotates about a crankshaft axis (not shown). A crank position sensor 96 monitors the rotational position of the crankshaft 32 during operation. A spark plug 36 is positioned within each combustion chamber 26 of each cylinder 24, the spark plugs 36 being operated at or near the end of a compression stroke to ignite the fuel/air mixture within the combustion chamber 26. A high voltage ignition coil 40 is coupled to each spark plug 36 to energize the spark plug 36 with high voltage electrical energy.

The intake system of the engine 20 includes an intake manifold 42 that directs air taken in through a filter 44 into all of the cylinders 24 of the engine 20. A throttle body including a throttle valve 48 is positioned downstream of the air filter 44 and is operable to throttle the flow of intake air through the manifold 42. Engine torque output or load is modulated by the throttle valve 48. A throttle valve control 52 is coupled to the throttle valve 48 and operable to change the position of the throttle valve 48 between a minimum opening and wide-open conditions. The throttle valve control 52 can be an electromechanical device responsive to an accelerator pedal within a cabin of the vehicle, although the throttle valve 48 can be manipulated in any one of a variety of methods. A throttle bypass 56 is provided adjacent the throttle valve 48. In the case of a forced-induction engine, a blow-off valve 58 may be provided at the throttle bypass 56 to relieve excess pressure in front of the throttle valve 48 in cases of compressor surge. Air passed through the throttle valve 48 to the intake manifold 42 is distributed to the individual cylinders 24 by a plurality of individual cylinder intake runners 60 extending from the downstream end of the manifold 42. In other applications, such as heavy-duty or commercial engines, there may be no physical runners defining individual passages between the intake manifold 42 and the intake port of the cylinder head.

Turning now to the fuel system, gaseous fuel is supplied to the cylinders 24 via a combined injection strategy, which injects fuel at multiple locations within the intake system, including both central point injection and multipoint injection. For the purposes of this description, central point injection is defined as injection of fuel that distributes fuel from one or more central fuel injectors 64 to all of the cylinders 24 of the engine 20 with no individual cylinder control. As shown in FIG. 1, central point injection is provided by one or more central fuel injectors 64 are positioned upstream of the intake manifold 42. For example, the central fuel injector(s) 64 can be positioned immediately downstream of the throttle body and throttle valve 48 adjacent an inlet of the intake manifold 42. The central fuel injector(s) 64 can be positioned further upstream, including upstream of the throttle valve 48, in other constructions. In one construction, central injection is provided by a cluster of injectors installed within a mixer apparatus to promote a homogenous fuel/air mixture. For the purposes of this description, multipoint injection is defined as injection of fuel that provides fuel metering individually for each cylinder 24. For example, multipoint injection can include at least one fuel injector 68 (i.e., cylinder-dedicated injector) per cylinder 24 positioned downstream of the intake manifold 42. Each cylinder-dedicated injector 68 of the multipoint injection system can inject fuel into the downstream end of the associated intake runner 60, into the intake port of a cylinder head immediately upstream of the combustion chamber 26, or directly into the combustion chamber 26. In the case of an intake system without runners, where the intake air is taken into the cylinder head intake ports directly from the intake manifold 42, multipoint injection can be provided by fuel injectors positioned within the intake manifold 42, but being directed to have a spray targeted to an individual cylinder and timed to only dispense fuel when the intake valve for that cylinder is open to receive the fuel.

In addition to the separate types of injectors 64, 68, the fuel system includes a fuel storage tank 70 and a plurality of components along a supply line between the storage tank 70 and the injectors 64, 68. Downstream of the fuel storage tank 70, fuel flows through a main fuel supply line 71 provided with an emergency shutoff valve 72, a tank pressure sensor 74, a high pressure fuel filter 78, and a fuel pressure regulator 82. An inlet valve 86 at the downstream end of the main fuel supply line 71 provides fuel flow to first and second branch lines 87, 89 to the central and cylinder-dedicated injectors 64, 68, respectively. Although not shown, it should be understood that an individual branch line 89 is provided for each of the individual cylinder-dedicated injectors 68. As shown in FIG. 1, a combined low pressure and temperature sensor 90 is provided in the branch line 89.

Combustion within the engine 20 is monitored by a knock sensor 94 and an exhaust gas sensor 98 configured to detect excess air factor (lambda). The sensors 94, 98 communicate signals indicative of the measured values with an engine control unit or ECU 100. The ECU 100 provides electronic control of the cylinder-dedicated injectors 68, the central injector(s) 64 (via the inlet valve 86), and all other electronic components of the engine 20 as shown in FIG. 1. The ECU 100 is also electrically connected to a battery 102, an alternator 104, and a starter 106.

Fuel/air mixing is a critical parameter for ensuring efficient combustion with gaseous fuel and air. In the case of a natural gas-burning engine, due to the fact that natural gas is a gaseous fuel with a relatively slow flame speed, fuel/air mixing is all the more critical. The timing of the heat release associated with burning a fuel air mixture is directly proportional to the engine's efficiency. A well-mixed and stoichiometric blend of air and fuel will have the fastest and most uniform rate of heat release. In combustion and fluid dynamics, mixing time is defined as the amount of time required until a mixture has reached its desired composition. For internal combustion applications, the available time for mixing is dictated by engine geometry, engine speed, and placement of the fuel injection equipment.

Multipoint injection allows the fastest engine response due to the shorter time to transport the fuel to the cylinders 24 and its ability to precisely meter fuel quantities for each cylinder 24. When used alone, the drawback of multipoint fuel injection is that the length between the injection point and the combustion chamber is relatively small especially in the case of heavy duty engines. Therefore, the time available for mixing is limited. The fuel is injected while the intake valve is open and may not have time to fully mix before combustion. This can result in poor fuel efficiency, and potentially high hydrocarbon emissions. A tradeoff exists between drivability under high engine dynamic conditions (acceleration/deceleration) and allowing enough time for the fuel to mix prior to the start of combustion.

As described above, central point injection can occur upstream of the intake manifold 42 (e.g., immediately downstream of the throttle body and the throttle valve 48). The desired quantities of fuel and air are mixed prior to the individual cylinder intake runners 60. The available time for injection and mixing is quite long compared to multipoint injection. This allows a homogenous fuel/air mixture to form, which will burn more efficiently and completely. When used alone, the drawback of central point injection is its inability to control individual cylinder fuel metering as the fuel/air mixture is divided amongst all of the individual cylinders passively without finite control. It also requires a longer time to respond to a driver's torque command due to the injection point being relatively far upstream of the cylinders 24. A central point injection system needs assistance to precisely meter fuel under acceleration/deceleration and to respond to engine issues such as knock, exhaust gas temperature, or emissions faults. The combination of multipoint injection and central point injection as illustrated by FIG. 1 combines the advantages and overcomes the various deficiencies of the individual injection strategies. Advantages include improved fuel economy due to homogenous mixture, gain in efficiency via precise fuel metering during acceleration/deceleration, good response to high engine dynamic conditions, precise exhaust gas temperature and emissions control, and higher compression ratio operation. Although higher compression requires precise knock detection, it raises maximum efficiency.

In the engine 20 of FIG. 1, central point injection from the central fuel injector 64 provides a well-mixed fuel/air mixture in the intake manifold for use by all cylinders 24, while multipoint injection from the individual cylinder-dedicated injectors 68 provides the necessary fuel for each cylinder 24 to balance the mixtures between the cylinders 24, provide extra torque for immediate acceleration or cut-off fuel injection to save fuel or lower the exhaust gas temperature. Precise control of the air/fuel ratio ensures proper emissions conversion in a three-way exhaust catalyst typically used in spark-ignited gaseous fuel (e.g., natural gas) engines. A steady-state baseline torque is provided by central point injection that can be supplemented by the multipoint injection system. This combination provides the ultimate control and flexibility in the gaseous fuel engine 20, with improvements in fuel efficiency and drivability of the vehicle having the engine 20.

With respect to the fueling strategy, a steady-state torque can be provided primarily by central point injection. A fraction of the total steady-state torque will come from multipoint injection at each cylinder 24. In other words, the total amount of fuel required to produce a particular steady-state torque includes a majority portion provided by the central fuel injector 64 and a minority portion provided by the cylinder-dedicated fuel injectors 68. This strategy allows the fuel system to immediately reduce the fuel supply to each cylinder 24 during deceleration, or decrease from a steady-state torque level. The opposite effect is also possible for acceleration, or increase from a steady-state torque level. Under acceleration, the amount of fuel supplied by the multipoint injection system increases to rapidly generate the torque desired by the driver. Due to the proximity of the multipoint injection system to the combustion chamber, it can more rapidly respond to driver pedal input. This is an efficient way of controlling torque while utilizing the benefits of both systems.

Figure 2:
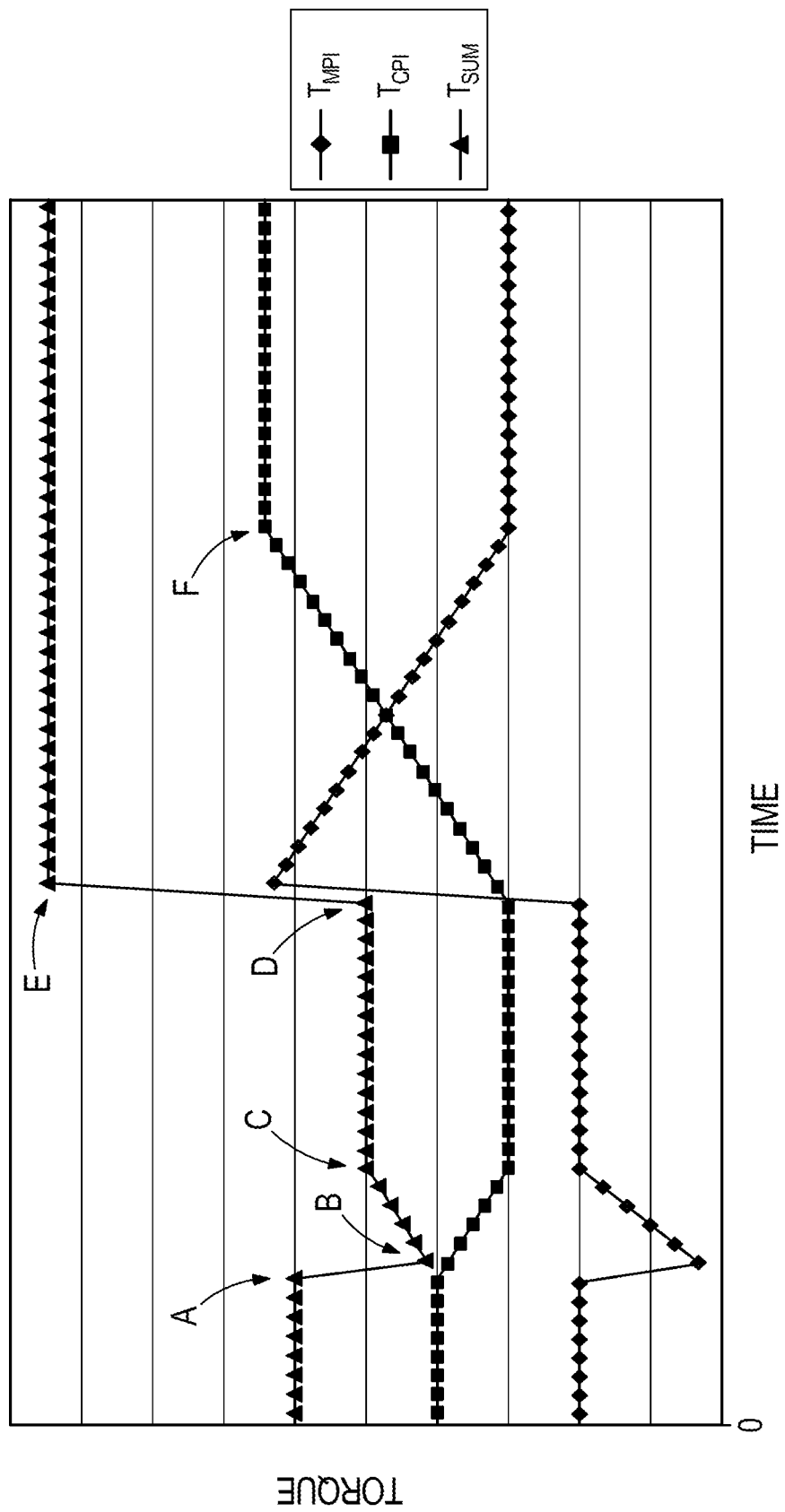
FIG. 2 is a torque vs. time graph illustrating an operating method according to one aspect of the present invention.

A fueling strategy, including individual fueling responses according to certain aspects of the invention, is illustrated by the torque vs. time plot of FIG. 2. The figure graphically represents an exemplary sequence of changing total torque demand $T_{SUM}$ from the driver of the vehicle, each value of which corresponds to a total fuel amount required for the engine to produce the torque. Times or events occurring throughout the time span illustrated are labeled with sequential letters. The figure illustrates three exemplary steady-state conditions for three different $T_{SUM}$ values within a load range of the engine 20, as well as acceleration and deceleration events between the various steady-state conditions. Every torque demand $T_{SUM}$ is met by a combination of torque attributable to the amounts of fuel supplied by central point injection $T_{CPI}$ and torque attributable to the fuel supplied from the multipoint injectors $T_{MPI}$. At the initial steady-state partial load condition (from 0 to A), $T_{CPI}$ provides more than 50 percent of the driver demanded torque $T_{SUM}$. For example, as illustrated, the driver demanded torque $T_{SUM}$ is made up of about 67 percent $T_{CPI}$ and about 33 percent $T_{MPI}$. At the driver's demanded deceleration event A, $T_{MPI}$ exhibits a fast cutoff for immediate response by time B, at which time $T_{CPI}$ is only beginning to decline. In other words, the slope of $T_{MPI}$ has an absolute value substantially greater than the slope of $T_{CPI}$. The slope of $T_{MPI}$ is negative due to the event being a decrease in total torque demand $T_{SUM}$, and as illustrated in FIG. 2, the slope of $T_{MPI}$ from point A to point B is approximately equal to the slope of $T_{SUM}$. After reaching a local minimum at B, the total torque demand $T_{SUM}$ increases in a reacceleration event, which in this case is still slightly less than the initial steady-state value. In this region, between B and C, $T_{MPI}$ single-handedly responds in the increasing direction (positive slope, having a higher value than the slope of $T_{SUM}$) to reach the new steady-state value of $T_{SUM}$, while $T_{CPI}$ continues in its original descent (negative slope) from point A where deceleration is initially demanded, making a single, more gradual response from A to C where the new steady-state condition is established. The response of the central point injection can be a single steady response that is unidirectional and linear across both of the deceleration and reacceleration events. In the steady-state condition from C to D, $T_{CPI}$ provides more than 50 percent of the driver demanded torque $T_{SUM}$. However, the value of $T_{CPI}$ and the fraction of $T_{SUM}$ can be different than the value from 0 to A. For example, as illustrated, the driver-demanded torque $T_{SUM}$ is made up of about 60 percent $T_{CPI}$ and about 40 percent $T_{MPI}$. On the other hand, the actual value of $T_{MPI}$ can be the same for the two different steady-state values of $T_{SUM}$ (0 to A, and C to D). The fuel balance that determines the various fractions for $T_{CPI}$ and $T_{MPI}$ can be predetermined for all possible steady-state loads and controlled by the ECU 100. Additional factors may also be considered by the ECU 100 so that the fractions of $T_{CPI}$ and $T_{MPI}$ are variable in response to other driving parameters or conditions (e.g. duration of the current torque demand, ambient conditions, oil or water temperature of the engine 20).

A substantial acceleration event occurs at D, where the torque demand $T_{SUM}$ is sharply increased. As with the deceleration demand, $T_{MPI}$ exhibits a fast transient response for almost immediately achieving the increase to the new $T_{SUM}$ value, within the span from D to E, while $T_{CPI}$ responds more gradually over the time span from D to F. It should be noted that the initial response of $T_{MPI}$ is a primary response, which compensates for the slower response of $T_{CPI}$. The compensation occurs by having the $T_{MPI}$ fraction of $T_{SUM}$ temporarily exceed the final steady-state target for the $T_{MPI}$ fraction corresponding to the demanded $T_{SUM}$ value. During the primary response, the slope of $T_{MPI}$ is approximately equal to the slope of $T_{SUM}$ during the acceleration event. This is followed by a secondary response in $T_{MPI}$ in a direction opposite the primary response and opposite the direction of change in $T_{SUM}$, in this case, having a negative slope immediately following the region of positive slope. The absolute value of the slope in the secondary response region is less than the slope in the primary response region. The secondary response occurs simultaneously with the single, gradual and steady response of $T_{CPI}$ until the steady-state fuel ratio is achieved at F. The steady-state $T_{SUM}$ value is maintained throughout this "rebalancing" time span (E to F), where the values of $T_{MPI}$ and $T_{CPI}$ are modulated toward the predetermined ratio. In essence, the predetermined long-term balance between $T_{MPI}$ and $T_{CPI}$ for the demanded torque $T_{SUM}$ is temporarily ignored to achieve a faster response, in this case resulting in $T_{MPI}$ temporarily providing the majority fraction of $T_{SUM}$ until $T_{CPI}$ gradually takes precedence and ultimately reaches the steady-state target value at F. The ECU 100 may be programmed to increase $T_{CPI}$ up to a predetermined majority fraction for steady-state conditions (at least above a certain threshold torque amount), and $T_{MPI}$ is decreased to make up the difference between $T_{CPI}$ and the total steady-state demand $T_{SUM}$. The predetermined majority fraction may be dependent upon the torque amount $T_{SUM}$.

What is claimed is:

1. A method of operating an internal combustion engine with gaseous fuel, the method comprising:
   providing a plurality of cylinders having respective pistons and combustion chambers;
   providing an intake system including a throttle body, and an intake manifold, ; and
   providing a fuel system configured to supply a quantity of fuel and inject the fuel in a gaseous state, the fuel supply system including
   a central fuel injector positioned upstream of the intake manifold and configured to provide fuel to all of the plurality of cylinders, and
   a plurality of cylinder-dedicated fuel injectors separate from the central fuel injector, each of the plurality of cylinder-dedicated fuel injectors positioned downstream of the central fuel injector and configured to provide fuel to only one associated cylinder of the plurality of cylinders;
operating the internal combustion engine at a steady-state partial load with a first portion of gaseous fuel supplied by the central fuel injector and a second portion of gaseous fuel supplied by the plurality of cylinder-dedicated fuel injectors;
identifying a demand for a change in total fuel amount for the engine to a target total fuel amount, the demand defining a transition point;
identifying a target fraction of the total fuel amount for each of the central fuel injector and the plurality of cylinder-dedicated fuel injectors for steady-state operation at the target total fuel amount; and
responding to the change by gradually changing the fuel amount from the central fuel injector to the corresponding target fraction within a first time span from the transition point and, within a second time span from the transition point, shorter than the first time span, exceeding the corresponding target fraction for the plurality of cylinder-dependent fuel injectors to compensate for the slower response of the central fuel injector and meet the target total fuel amount prior to expiration of the first time span.

2. The method of claim 1, wherein the first portion of gaseous fuel is a majority portion and the second portion of gaseous fuel is a minority portion, and wherein upon the change being an increase in total fuel, the exceeding of the corresponding target fraction for the plurality of cylinder-dedicated fuel injectors results in the plurality of cylinder-dedicated fuel injectors providing a temporary majority of the total fuel amount.

3. The method of claim 1, further comprising defining a steady-state combined fueling strategy including portions of fuel supplied by the central fuel injector and by the plurality of cylinder-dedicated fuel injectors for operation at the target total fuel amount, the steady-state ratio being achieved only upon elapse of the first time span.

4. The method of claim 1, further comprising supplying the central fuel injector and the plurality of cylinder-dedicated fuel injectors with gaseous fuel from a common storage tank.

5. The method of claim 4, wherein the first and second portions of gaseous fuel include natural gas.

6. The method of claim 4, wherein the first and second portions of gaseous fuel include propane.

7. The method of claim 1, wherein the response of the central fuel injector is maintained at a substantially steady rate throughout the first time span.

8. The method of claim 1, wherein exceeding the corresponding target fraction for the plurality of cylinder-dedicated fuel injectors is a primary response of the plurality of cylinder- dedicated fuel injectors, the response to the change further comprising a secondary response of the plurality of cylinder-dedicated fuel injectors in a direction opposite that of the primary response and within the first time span.

9. The method of claim 1, wherein the central fuel injector sprays gaseous fuel adjacent an upstream end of the intake manifold, downstream of the throttle body.

10. The method of claim 1, wherein each of the plurality of cylinder-dedicated fuel injectors injects fuel into a separate one of a plurality of runners coupling the intake manifold to the plurality of cylinders.

11. A method of operating an internal combustion engine with gaseous fuel, the method comprising:
operating the internal combustion engine at a first steady-state torque output with a total gaseous fuel amount including a first portion of gaseous fuel supplied by a central fuel injector for combustion by all of a plurality of cylinders of the internal combustion engine and a second portion of gaseous fuel supplied to individual ones of the plurality of cylinders via a plurality of cylinder-dedicated fuel injectors;
detecting a target torque output demanded from the internal combustion engine within an available torque output range, the target torque output requiring a change in the total gaseous fuel amount corresponding to the first steady-state torque output, the change having a direction which is one of increasing or decreasing;
identifying a total gaseous fuel amount corresponding to the target torque output and a corresponding steady-state ratio between gaseous fuel supplied by the central fuel injector and gaseous fuel supplied by the plurality of cylinder-dedicated fuel injectors for the target torque output; and
achieving the steady-state ratio by providing a two-part response by the plurality of cylinder-dedicated fuel injectors and a single response by the central fuel injector,
wherein the target torque output is initially achieved upon completion of a primary response in the direction of change by the plurality of cylinder-dedicated fuel injectors, and
wherein the target torque output is maintained during a secondary response by the plurality of cylinder-dedicated fuel injectors in the direction opposite the change.

12. The method of claim 11, wherein the first portion of gaseous fuel is a majority portion and the second portion of gaseous fuel is a minority portion, and wherein upon the direction of change being increasing, the primary response of the plurality of cylinder-dedicated fuel injectors results in the plurality of cylinder-dedicated fuel injectors providing a temporary majority of the total gaseous fuel amount.

13. The method of claim 11, wherein the steady-state ratio is not achieved until the secondary response of the plurality of cylinder-dedicated fuel injectors and the unidirectional response by the central fuel injector are completed.

14. The method of claim 11, further comprising supplying the central fuel injector and the plurality of cylinder-dedicated fuel injectors with gaseous fuel from a common storage tank.

15. The method of claim 14, wherein the first and second portions of gaseous fuel include natural gas.

16. The method of claim 14, wherein the first and second portions of gaseous fuel include propane.

17. The method of claim 11, wherein the single response of the central fuel injector is a unidirectional response in the direction of the change, which occurs at a slower rate than the primary response of the plurality of fuel injectors.

18. The method of claim 17, wherein the single response of the central fuel injector occurs simultaneously with the primary and secondary responses of the plurality of fuel injectors.

* * * * *